United States Patent Office 3,322,568
Patented May 30, 1967

3,322,568
COMPOSITION AND METHOD FOR PRODUCING LEATHER SUBSTITUTE
Marcos M. Golodner, West Orange, N.J., assignor to Interchemical Corporation, New York, N.Y., a corporation of Ohio
No Drawing. Filed Mar. 15, 1963, Ser. No. 265,369
9 Claims. (Cl. 117—135.5)

This invention relates to a novel breathable coated fabric which provides an excellent leather substitute having both the hand or feel of leather and water vapor transmission or breathability of that of leather.

A good leather substitute should have several basic qualities: (1) a hand like that of leather, (2) a breathability of that of leather, (3) a good tear strength or resistance to tearing and (4) its top or exposed surface should have no visible pores.

Copending applications S.N. 262,813 entitled, "Novel Leather Substitute and Method for Producing the Same," in the name of Norman J. Bertollo, filed on Jan. 7, 1963, now Patent No. 3,222,208 and S.N. 265,339 entitled "Improvements in a Method for Producing Novel Leather Substitutes" in the name of Marcos M. Golodner, filed on Mar. 15, 1963, now Patent No. 3,169,885 are directed to novel coated fabrics quite similar to leather in the aforementioned properties. The disclosures of said applications are hereby incorporated into and made part of the present application.

I have discovered a novel coated fabric which is quite similar to leather in these properties.

The novel coated fabrics of these copending applications comprise a textile substrate, which may be a woven or a non-woven textile, carrying a porous polymeric coating comprising the polyesterurethane elastomers described in U.S. Patent 2,871,218. The porous coating has dispersed therein a flock.

While the product described in the copending application has very remarkably leatherlike properties, the product has a soft leather and suede-like appearance and hand. Such softer coated fabrics are less than fully desirable as leather substitutes in shoe uppers where a harder hand is required.

The leather-substitute of this invention provides such a harder hand while retaining the breathability and other properties required of a leather substitute.

In the product of this invention all or a substantial portion of the flock is replaced by a clay. In addition, a hand like hard leather may be further effected by the substitution for a portion of the polyesterurethane by other resins including polymethylmethacrylate, vinyl chloride-vinyl acetate copolymers and cellulose acetate butyrate.

In the description and claims which follow, all proportions are by weight unless otherwise stated.

The polyesterurethane of Patent No. 2,871,218 is dissolved in a suitable solvent, preferably methyl ethyl ketone or tetrahydrofuran. Cyclohexanone may also be used as a solvent. Preferably, the polyesterurethane used as a 20% to 35% solution and most preferably as a 25% to 30% solution.

The solution of the polymeric material is mixed with water to form a dispersion to which the clay is added and dispersed. Preferably, the water added is about from 5% to 30% of the weight of the solvent present and most preferably is from 15% to 20% of the weight of the solvent.

The clays are preferably the types used in rubber making and known as rubber clays. These rubber clays are described in detail on pages 73–75, vol. 4 of the Encyclopedia of Chemical Technology edited by Kirk and Othmer (1949). The essential constituent of rubber clay is the mineral Kaolinite, $Al_2SO_3 \cdot 2SiO_2 \cdot 2H_2O$, a hydrated aluminum silicate. The rubber clay also contains small amounts of iron oxide, lime, magnesia, titanium dioxide and traces of $K_2O$ or $Na_2O$. The amount of residue failing to pass through a 325-mesh screen usually varies from a trace up to 3.5%. Preferably the weight of the clay used varies from about 10% to about 60% of the weight of the polyesterurethane used. Where a softening of the hand is desired part of the clay may be replaced with flock of the type described in the copending applications.

As has been indicated in the copending Golodner application the leather-like characteristics of the coated fabric may be enhanced if a surfactant is contained in the polyesterurethane solution. Suitable surfactants include alkyl aryl polyether alcohol types such as

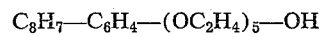

$$C_8H_7—C_6H_4—(OC_2H_4)_5—OH$$

as well as sorbitan oleates such as sorbitan trioleate. Best results are achieved when the surfactant used is polyoxyethylene sorbitan mono-oleate. This surfactant is believed to have plasticizing and other effects in addition to its effects as a surfactant. When present the polyoxyethylene sorbitan mono-oleate preferably equals from 10% to 40% of the polyesterurethane weight.

It is also noted in said application that results are improved if the water being dispersed in the solution contains either gum tragacanth, gum arabic or gum karaya. When present these additives preferably equal from 2% to 10% of the weight of the polyesterurethane in the dispersion.

The coated fabric may be colored either by using colored flock as the flocking material or by the inclusion of pigment. The pigment is used in amounts preferably up to 10% of the weight of the polymer.

It has been further found that a harder hand similar to that of the leather in shoe uppers may be effected through the replacement of part of the polyesterurethane with a resin selected from the group consisting of polymethylmethacrylate, vinyl chloride-vinyl acetate copolymers and cellulose acetate butyrate. When used, these resins preferably replace from 10% to 40% of the polyesterurethane.

The coating composition is applied to the substrate at a wet coating thickness preferably from about 40 to 150 mils. The substrate is preferably a woven textile. Cotton textiles have produced good results. However, any of a wide variety of natural and synthetic textiles would give satisfactory results e.g., nylon, polyesters such as Dacron materials, materials of acrylics such as Orlon, vinyl chloride copolymers, cellulosics such as rayon and cellulose acetate as well as natural materials such as cotton, wool, ramie, hemp and linen.

The coated fabric is then leached. It is preferable that the leaching step be commenced as soon as possible after the coating step. Leaching is accomplished by placing the coated fabric into a current of flowing water. This may be done by placing the coated fabric into a tank of moving water from which water is being continuously removed and into which fresh water is being continuously fed. The preferred leaching times may vary from 10 minutes to 16 hours (maximum), and the preferred leaching temperatures from about 12° C. to about 65° C. (maximum). When using shorter leaching times e.g., in the order of 10 minutes to 3 hours, it is preferable to employ hot water e.g., at temperatures of from 40 to 60° C. When using cold water for leaching e.g., at temperatures of from 12 to 25° C., it is preferable to use longer leaching times e.g., more than 2 hours and most preferably from about 3 to 16 hours. The leaching may also be conducted in part with hot water and in part with cold water, e.g., 2 hours at 15° C. to 18° C. and 2 hours at 40 to 45° C. We have found that during the leaching step, a major portion of the solvent is removed from the coated fabric. However, this is clearly not the only effect of the leaching step.

Such other effects have not been definitely ascertained but it is known that they contribute to the leather-like hand and breathability of the coated fabric. For example, we have found that when the solvent is removed by evaporation rather than leaching, the resulting coated fabric has a stiff hand unlike that of leather and has very low water vapor transmission. Even where the wet coated fabric is permitted to partially air-dry prior to leaching the hand and the water vapor transmission of the coated fabric are significantly downgraded.

After leaching is completed, the coated fabric is permitted to dry, suitably by air drying. However, the drying may also be conducted at higher temperatures.

It should also be understood that the coated fabrics of this invention may be further overcoated with top coats which do not appreciably reduce water vapor transmission.

The following examples will illustrate the practice of this invention.

*Example I*

A polyesterurethane is prepared following the procedure set forth in U.S. Patent 2,871,218, col. 4, lines 13 to 27. A mixture of 1447 g. (1.704 mols) of hydroxyl poly(tetramethylene adipate), molecular weight 849, hydroxyl number 130.4, acid number 0.89, and 109.6 g. (1.218 mols) of butanediol-1,4 is melted in a four liter kettle and stirred with a spiral ribbon stirrer for about 20 minutes at a pressure of 5 to 6 mm. at 100 to 110° C. To this mixture, there is added 730 g. (2.92 mols) of diphenyl methane-p, p' diisocyanate. This mixture is stirred for about 1 minute and is then poured into a lubricated one gallon can which is promptly sealed with a friction top and the can placed in a 140° C. oven for 3.5 hours. The product is then cooled.

In 300 g. of a solution of the above polyesterurethane in methyl ethyl ketone (27.5% solids by weight), there is dissolved 16.5 g. of polyoxyethylene sorbitan monooleate. 68.8 g. of a 6% aqueous solution of gum tragacanth are added to the solution and the mixture is stirred to form a creamy dispersion. To this mixture, there is added 33.0 g. of rubber clay containing about 38% $Al_2O_3$ and 44% $SiO_2$ in the form of the hydrated aluminum silicate, kaolinite, $Al_2O_3 \cdot 2SiO_2 \cdot 2H_2O$ as well as about 1% $Fe_2O_3$, 0.9% $TiO_2$, 0.4% CaO, 0.25% MgO and traces of $Na_2O$ and $K_2O$, and the mixture is stirred to evenly disperse the clay. The mixture is then deaerated by the application of a partial vacuum of 400 mm. for about 5 minutes while continually stirring. The mixture is coated at a thickness of 1/8 inch onto a cotton sheet having a weight of 0.002 ounce per square inch. As soon as possible after coating, the coated fabric is leached with water. This is accomplished, for example, by placing a piece of the coated fabric 1.5 sq. ft. in area in a tank containing 2 gallons of water and then flowing water through the tank at the rate of 1/3 of a gallon a minute to replace the water in the tank. The leaching is carried out for about 2 hours at a water temperature of 17°–19° C. and continued for another 3 hours at a 42°–47° C. water temperature. The resulting coated fabric has a firm hand which is close to the hand of leather used in shoe uppers. The fabric has a water vapor transmission of about 110 according to ASTM-E96–53T, that is the water vapor transmission of the product is about 110 g./square meter/24 hours at a 100% relative humidity and a temperature of 100° F. while natural leather has a water vapor transmission of from 80 to 150 g./square meter.

*Example II*

Example I is repeated using the same ingredients, proportions and conditions except that 19 g. of a rayon flock having an average fiber length of about .03 inch is used in addition to the clay. The resulting coated fabric has a hand firmer than that of Example I but softer than that of Example II. The water vapor transmission of the fabric is about 200.

*Example III*

Example I is repeated using the same ingredients, proportions and conditions except that in place of the polyesterurethane used in Example I, a polyesterurethane made in accordance with the description set forth in U.S. Patent 2,871,218, col. 5, lines 19–28 is used. The resulting coated fabric has properties very close to those described for the product of Example I.

*Example IV*

Example I is repeated using the same ingredients, conditions and proportions except that 20% of the polyesterurethane is substituted for by a copolymer comprising 10% vinyl acetate and 90% vinylidene chloride. The hand of the coated fabric is close to that of Example II. The fabric has a water vapor transmission of 150.

*Example V*

Example I is repeated using the same ingredients, conditions and proportions except that 30% of the polyesterurethane is substituted for by cellulose acetate butyrate. The hand of the coated fabric is close to that of Example I. The fabric has a water vapor transmission of 200.

*Example VI*

Example I is repeated using the same ingredients, conditions and proportions except that 25% of the polyesterurethane is substituted for by polymethylmethacrylate. The hand of the coated fabric is close to that of Example I. The fabric has a water vapor transmission of 160.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A coating composition comprising clay dispersed in a mixture of water having dissolved therein a gum selected from the group constisting of gum tragacanth, gum karaya and gum arabic and a solution in a solvent selected from the group consisting of methyl ethyl ketone, tetrahydrofuran and cyclohexanone of polyesterurethane elastomer produced by heating a mixture comprising as essential polyesterurethane forming ingredients (1) one mol of an essentially linear hydroxyl terminated polyester of a saturated aliphatic glycol having from 4 to 10 carbon atoms and having hydroxyl groups on its terminal carbon atoms and a material selected from the group consisting of a dicarboxylic acid of the formula

HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus in the presence of (3) from about 0.1 to 2.1 mols of a saturated, aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said elastomer said clay having a weight from 10% to 60% the weight of said polyesterurethane.

2. The coating composition of claim 1 wherein said solution further includes polyoxyethylene sorbitan monooleate.

3. A method for making a water vapor permeable coated fabric comprising dispersing (A) clay in a mixture of (B) water having dissolved therein a gum selected from the group consisting of gum tragacanth, gum karaya and gum arabic and (C) a solution in a solvent selected from the group consisting of methyl ethyl ketone, tetrahydrofuran and cyclohexanone of an essentially linear polyesterurethane elastomer which is the reaction product obtained by heating a mixture comprising as essential polyurethane ingredients (1) one mol of an essentially linear hydroxyl terminated polyester of a saturated aliphatic glycol having from 4 to 10 carbon atoms and having hydroxyl groups on its terminal carbon atoms and a material selected from the group consisting of a dicarboxylic acid of the formula

HOOC—R—COOH where R is an alkylene radical containing from 2 to 8 carbon atoms and its anhydride, said polyester having an average molecular weight between 600 and 1200 and having an acid number less than 10, and (2) from 1.1 to 3.1 mols of a diphenyl diisocyanate having an isocyanate group on each phenyl nucleus in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no groups of the claims consisting of isocyanate and hydroxyl groups in said reaction product said clay having a weight from 10% to 60% the weight of said polyesterurethane, then applying said dispersion to the surface of a textile substrate and leaching said coated textile with water to remove the solvent.

4. The method of claim 3 wherein the polyesterurethane solution further contains polyoxyethylene sorbitan mono-oleate.

5. The method of claim 3 wherein the substrate is a cotton fabric.

6. A method for making a water vapor permeable coated fabric comprising dispersing (A) clay in a mixture of (B) an aqueous solution of gum tragacanth and (C) a solution in methyl ethyl ketone comprising polyoxyethylene sorbitan mono-oleate and an essentially linear polyesterurethane elastomer which is the reaction product obtained by heating a mixture comprising as essential polyurethane ingredients (1) one mol of an essentially linear hydroxyl terminated polyester of a saturated aliphatic glycol having from 4 to 10 carbon atoms and having hydroxyl groups on its terminal carbon atoms and a material selected from the group consisting of a dicarboxylic acid of the formula

HOOC—R—COOH where R is an alkylene radical containing from 2 to 8 carbon atoms and its anhydride, said polyester having an average molecular weight between 600 and 1200 and having an acid number less than 10 and (2) from 1.1 to 3.1 mols of a diphenyl diisocyanate having an isocyanate group on each phenyl nucleus in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no groups of the class consisting of isocyanate and hydroxyl groups in said reaction products, said clay being from 10% to 60% the weight of said polyesterurethane then applying said dispersion to the surface of a textile substrate, leaching said coated textile with water to remove the solvent and drying the coated fabric.

7. The method of claim 6 wherein said methyl ethyl ketone solution further contains polymethyl methacrylate blended with said polyesterurethane said polymethyl methacrylate replacing from 10 to 40% the weight of the polyesterurethane.

8. The method of claim 6 wherein said methyl ethyl ketone solution further contains cellulose acetate butyrate blended with said polyesterurethane said cellulose acetate butyrate replacing 10 to 40% the weight of the polyesterurethane.

9. The method of claim 6 wherein said methyl ethyl ketone solution further contains a copolymer of vinyl chloride and vinyl acetate blended with said polyesterurethane said copolymer replacing 10 to 40% the weight of polyesterurethane.

References Cited
UNITED STATES PATENTS

| | | | |
|---|---|---|---|
| 2,940,001 | 11/1949 | Jayne et al. | 260—77 |
| 2,871,218 | 1/1959 | Schollenberger | 260—32.6 X |
| 2,929,800 | 3/1960 | Hill | 260—32.6 X |
| 3,085,896 | 4/1963 | Britt et al. | 117—33 |
| 3,100,721 | 8/1963 | Holden | 117—135.5 |

WILLIAM D. MARTIN, *Primary Examiner.*

RICHARD D. NEVIUS, *Examiner.*

T. G. DAVIS, *Assistant Examiner.*